INVENTOR
JOSEPH H. COPE
BY
ATTORNEY

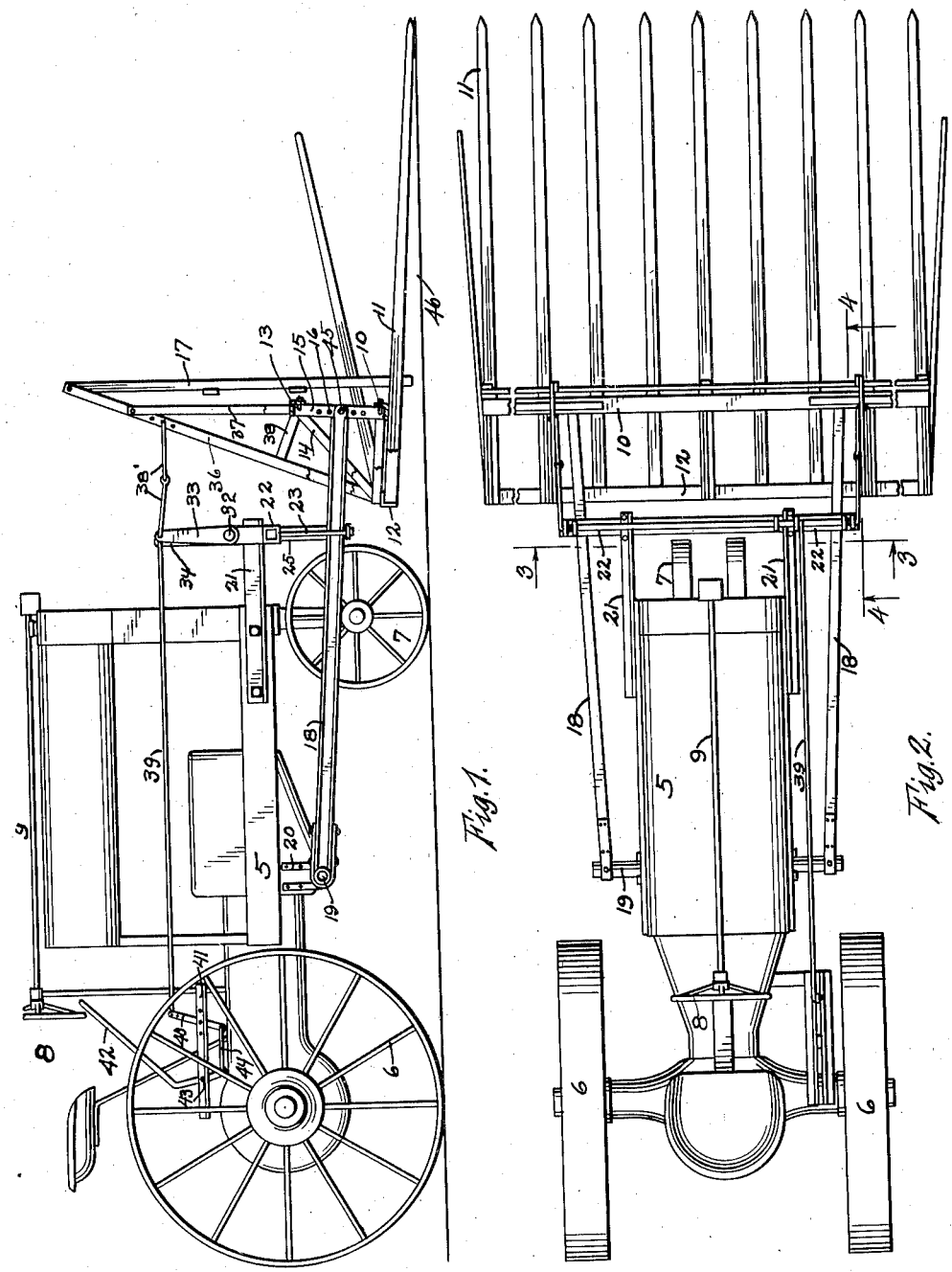

Patented Feb. 21, 1939

2,147,884

UNITED STATES PATENT OFFICE 2,147,884

POWER OPERATED SWEEP RAKE

Joseph H. Cope, Denver, Colo., assignor to Western Land Roller Company, Hastings, Nebr., a copartnership consisting of Chas. M. Anderson, M. George Anderson, Arthur H. Anderson, Edna F. Anderson, Paul Anderson, and Carrie Glass Application May 10, 1937, Serial No. 141,633

8 Claims. (Cl. 56—27)

This invention relates to improvements in power operated sweep rakes and has reference more particularly to means for effecting a hitch between the rake and a tractor.

It is now quite customary for farmers to employ tractors for power in many of the farm operations that were formerly effected by horses, and it is the object of this invention to produce a device for effecting a hitch between a tractor and a sweep rake.

The successful operation of a sweep rake by means of a tractor requires that several conditions must be provided for and some of these are the following:

(a) The sweep rake must be connected with the tractor in such a way that it can be guided;

(b) The rake must have a vertical movement relative to the tractor so that it can accommodate itself to the surface of the ground, when the later is uneven, and so that the weight of the tractor or any part thereof will not have to be carried by the rake in case the front wheels drop into a depression;

(c) The rake must be so mounted that the pushing force exerted by the tractor will be applied thereto in such a position that there will be a component which will tend to press the tips of the rake teeth against the surface of the ground;

(d) The hitch must be adjustable in such a way that the angle between the surface of the ground and the plane of the rake teeth can be varied and simultaneously therewith a variation in the ground pressure per unit of tractor effort effected; and (e) Means must be provided for tilting the rake head to a position where no part thereof will contact the ground so that the load may be supported entirely by the tractor and can be transported to the stacker.

The above and other necessary conditions that may appear as the description proceeds are provided for in the means that will now be described in detail, and which has been illustrated on the accompanying drawings, in which the invention has been illustrated in its preferred form, and in which:

Figure 1 is a side elevation of a tractor showing the sweep rake attached thereto;

Figure 2 is a top plan view of the assembly shown in Fig. 1;

Figure 3:
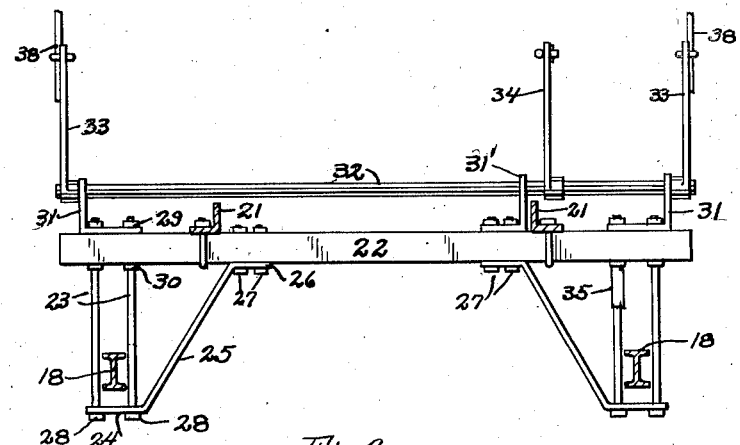
Figure 3 is a section taken on line 3—3, Fig. 2.

On the accompanying drawings, the invention has been illustrated in connection with one type of agricultural tractor. It is to be understood, however, that the specific make or type of tractor is immaterial and whenever this word is employed, it is to be understood as including any automotive vehicle.

In the form illustrated, the tractor frame or body has been designated by reference numeral 5, the rear wheels by 6 and the front wheels by 7. The front wheels are dirigible and the rear wheels are the drive wheels. The steering mechanism has not been illustrated but is represented by the steering wheel 8 and the rod 9.

The rake head is constructed in the usual way and consists of an angle iron bar 10 to the underside of which the rake teeth 11 are secured. Another angle iron bar 12 extends along the rear ends of the rake teeth. A third angle iron bar 13 is supported on vertical members 13a and braced to the bar 12 by means of diagonal braces 14. Two flat steel bars 15 extend between the angle irons 10 and 13 and are provided with a plurality of openings 16. A push-off mechanism 17 is provided which will not be described in detail because it forms no part of this invention. The rake head is supported on pusher bars 18 whose rear ends are pivoted to a transverse tubular shaft 19 that is attached to the tractor by some suitable means such as that indicated by 20 in Fig. 1. The position of the tubular member 19 relative to the tractor may be varied and can be located any place between the front and the rear wheels and in some cases may even be located at or even to the rear of the axle about which the rear wheels turn, although these are extreme cases. Secured to opposite sides of the tractor and extending forwardly thereof are two short angle iron supports 21 to the underside of which a rectangular tube 22 is secured. This tube extends outwardly beyond the sides of the tractor in the manner shown in Fig. 2, and near its ends two spaced guide members 23 are secured. These members extend downwardly in parallel relation and through spaced openings in the horizontal portion at the lower end of the diagonal brace 25. The upper end 26 of this brace is secured to member 22 by bolts or rivets 27. The guide members 23 are preferably bolts or bars having heads 28 at their lower ends and nuts 29 at their upper ends. Nuts 30 are also provided to engage the under surface of bar 22. Angle brackets 31 are secured to the upper side of the tubular bar 22 by means of the bolts 23 and nuts 29. Another angle bracket 31' is secured to the tubular bar and is held in place by means of bolts 27. The brackets 31 and 31' are provided with bearings in which is rotatably mounted a tubular shaft 32. Extending upwardly from the shaft 32 are three arms, two of which are positioned near its ends and have been designated by reference numeral 33 and the other is between the first two and has been designated by reference numeral 34. The pusher bars 18 extend through the space between the bolts 23 and the latter may be enclosed in pipes 35 as indicated in Fig. 3.

Figure 4:
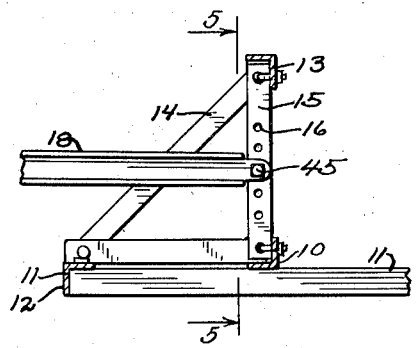
Figure 4 is a section taken on line 4—4, Figs. 2 and 5.
Figure 5:
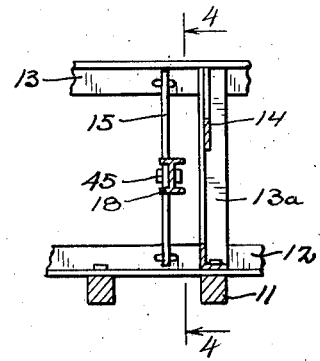
Figure 5 is a section taken on line 5—5, Fig. 4.

The front ends of the pusher bars are pivotally connected with the vertical bars 15 in the manner shown clearly in Figs. 1 and 4. It will be seen that bars 15 are provided with a plurality of holes 16 so that the pivotal connection with the pusher bars can be made at various distances above the plane of the rake teeth. Referring now more particularly to Fig. 1, it will be seen that a brace member 36 extends upwardly from the rear end of the rake head and is connected with the angle iron 13 by means of bars 37 and 38. The bars 36, 37, 14 and 38 form a triangular truss-like structure. Links 38' extend between the vertical bars 36 and the upper ends of the arms 33 in the manner shown in Fig. 1. A rod 39 has its front end connected with the upper end of arm 34 and extends to the rear of the tractor where its end is connected with a lever 40 pivoted between the spaced angle irons 41. A lever 42 is pivoted to the angle irons 41 at 43 and its lower end is connected with the lower end of the lever 40 by means of a link 44. The parts are so adjusted that when lever 42 is pulled rearwardly as far as it will go, the lower end of this lever and the link 44 form an overset toggle. It will be apparent that by moving lever 42 rearwardly, a corresponding movement will be given to the arms 33 and 34, and since arms 33 are connected with the bars 36 by means of the links 38', the rake head will be tilted about pivots 45, and the front of the rake teeth will be raised from the ground because when the rake head is tilted, the pusher bars rest on the parts 24, which limit their downward movement.

Figures 6, 7, 8:
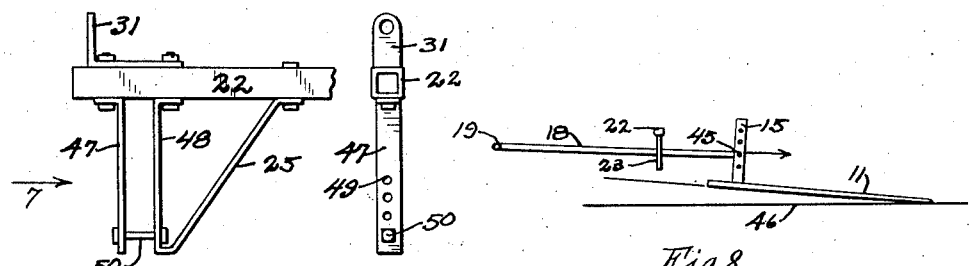
Figure 6 is a view showing a slightly modified form of guide.
Figure 7 is a side elevation, looking in the direction of arrow 7 in Fig. 6.
Figure 8 is a diagrammatic representation of some of the parts.

When the sweeper rake is operating, the force required to push the same along the ground, exerted by the pusher bars 18, is applied to the rake through pivots 45. Since these pivots are positioned above the plane of the rake teeth, it is apparent that a torque will be produced which tends to press the front ends of the rake teeth against the surface of the ground. The surface of the ground has been designated by reference numeral 46 in Figs. 1 and 8. It is also apparent from the drawings that by increasing the distance from the plane of the rake teeth to the pivots 45, the angle between the surface of the ground and the plane of the rake teeth will be decreased, and at the same time the torque will be increased. These two variations tend to neutralize each other to some extent. In the construction shown, it is also possible to effect a change in the angle between the rake teeth and the ground without changing the torque due to the force exerted by the pusher bars. This change can be effected by adjusting the distance of the lower limit of movement of the pusher bars from the tubular bar 22. In Fig. 6, a modification has been shown in which instead of bolts 23 having their ends connected with a cross bar 24, two flat bars 47 and 48 have been substituted. Bar 48 may have an extension that forms the brace 25. The two vertical bars 47 and 48 are provided with a number of spaced openings 49 for the reception of a bolt 50. By moving the bolt upwardly from the position shown in Figs. 6 and 7, the downward movement of the pusher bars 18 can be restricted and adjusted so as to obtain the optimum ground pressure and operating relation of the rake teeth with the ground.

When the rake is operating, lever 42 is moved forwardly so as to permit the rake head to rock freely about pivots 45 and thus enable it to follow irregularities of the ground surface. If the ground is rough and the rake head has to pass over an elevation in the ground, the pusher bars 18 can move upwardly until they reach the lower surface of the transverse bar 22. This floating arrangement makes it possible to operate on irregular ground without running any danger of having the weight of the tractor resting on the pusher bars and on the rake head as would sometimes be the case if the bars 18 were not vertically movable with respect to the tractor. With the present arrangement, if the front wheel of the tractor should drop into a depression or a ditch in the field, the weight of the tractor would not be transferred to the rake head because the pusher bars are free to move upwardly.

The bolts 23 and the corresponding vertical guide members 47 and 48 serve to limit the motion of the pusher bars transversely with respect to the tractor and this makes it possible to steer the rake so as to control its path.

After a load of hay has been accumulated on the rake, lever 42 is pulled rearwardly until the toggle, to which reference has heretofore been made, locks, and this raises the rake teeth from the ground and holds it in raised position so that the load can be carried and transported by the tractor to the hay stacker or to any other position where it is to be deposited.

The construction shown and described permits the rake head to rock with respect to the tractor so as to avoid the formation of dangerous strains in case the wheel on one side of the tractor should drop into a depression so as to tilt the tractor sidewise.

Particular attention is called to the various adjustments, particularly to the vertical adjustment of pivots 45 with respect to the plane of the rake teeth and the adjustment of the supporting bolt 50 which limits the downward movement of the pusher bars, as by these adjustments the relationship between the force and the ground pressure can be changed so as to obtain the best operation of the rake.

The construction shown on the drawings and described herein, although resembling in a general way the ordinary push sweep rakes, has, among others, the following important distinction, namely, that the pusher bars are supported by the tractor and the rake head is supported from the front ends of the pusher bars. In the ordinary horse operated sweep rake, the rake head is supported on wheels and the front ends of the pusher bars are supported by the rake head. With the present construction a vertical adjustment of the pivot 45 changes the angle between the plane of the rake teeth and the ground which has several important advantages and which does not result from a similar adjustment when the rake head is supported a fixed distance from the ground, as on wheels.

Having described the invention what is claimed as new is—

1. In a power operated sweep rake of the type operated by an automotive vehicle having a front wheel and rear wheels, the combination with said vehicle of two pusher bars pivotally connected at their rear ends therewith, a rake head pivoted to the front ends of the pusher bars, a transverse bar connected in horizontal position to said vehicle body above the front axle, vertical guide members carried by the transverse bar and extending downwardly on opposite sides of the pusher bars, for limiting transverse movement of the pusher bars relative to said vehicle, a shaft carried by the transverse bar for rotation about its axis, two arms secured to the shaft and spaced lengthwise thereon, links connecting the arms to the rake head at a point above its pivotal connection with the pusher bars, and means for turning the shaft to effect a tilting of the rake head.

2. In a power operated sweep rake of the type operated by an automotive vehicle having a front wheel and rear wheels, the combination with said vehicle of two pusher bars pivotally connected at their rear ends therewith, a rake head pivoted to the front ends of the pusher bars, a transverse bar connected in horizontal position to said vehicle body above the front axle and above the pusher bars, vertical guide members carried by the transverse bar and extending downwardly on opposite sides of the pusher bars, for limiting transverse movement of the pusher bars relative to said vehicle, stops attached to the guide members for limiting the downward movement of the pusher bars, said stops being adjustable in a vertical direction, a shaft carried by the transverse bar for rotation about its axis, two arms secured to the shaft and spaced lengthwise thereon, links connecting the arms to the rake head at a point above its pivotal connection with the pusher bars, and means for turning the shaft to effect a tilting of the rake head.

3. A power operated sweep rake of the class wherein the rake is positioned in front of an automotive vehicle, the combination with said vehicle of two pusher bars, one on each side thereof, the vehicle serving to support the bars above the ground, a rake head pivotally connected with the front ends of the pusher bars at a point spaced from the plane of the rake teeth, the pusher bars serving to support the rake head, means comprising a member attached to the rake head and provided with a plurality of openings positioned at different distances from the plane of the rake teeth for effecting an adjustment of the distance from the plane of the rake teeth to the pivotal connection with the pusher bars whereby the torque tending to produce ground pressure, per unit of force exerted by the pusher bars, can be varied, and means comprising flexible tension members for tilting the rake head about its pivotal connection with the pusher bars to raise it out of contact with the surface of the ground.

4. A power operated sweep rake of the class wherein the rake is positioned in front of an automotive vehicle, the combination with said vehicle of two pusher bars, one on each side thereof, the vehicle serving to support the bars above the ground, a rake head suspended from and pivotally connected with the front ends of the pusher bars at a point spaced above the plane of the rake teeth, means for effecting an adjustment of the distance from the plane of the rake teeth to the pivotal connection with the pusher bars comprising a bar attached to the rake head and projecting upwardly therefrom, said bar having a plurality of openings spaced different distances from the plane of the rake teeth whereby the angle between the plane of the rake teeth and the ground, and the torque tending to produce ground pressure, per unit of force exerted by the pusher bars, can be simultaneously varied by changing the position of the pivot, and means comprising flexible tension members for tilting the rake head about its pivotal connection with the pusher bars to raise it out of contact with the surface of the ground.

5. In a power operated sweep rake for use with tractors having forwardly extending pusher bars, a rake head comprising a transverse bar, having a plurality of spaced, parallel rake teeth secured thereto, a second bar secured to the rake teeth in front of and parallel with the first bar, two spaced vertical bars secured at their lower ends to the last named bar, a bar attached to the upper ends of the vertical bars, diagonal braces connecting the last named horizontal bar with the rear of the rake head, and two flat steel bars, attached at their ends to the two horizontal bars that are held in spaced relation by the vertical bars, said flat bars having a plurality of spaced openings for effecting pivotal connections with the pusher bars.

6. In a power operated sweep rake of the type operated by an automotive vehicle having a front wheel and rear wheels, the combination with said vehicle of two pusher bars pivotally connected at their rear ends therewith, a rake head pivoted to the front ends of the pusher bars, a transverse bar connected in horizontal position to said vehicle body above the center of the front wheel, vertical guide members carried by the transverse bar and extending downwardly adjacent the pusher bars, for limiting transverse movement of the pusher bars relative to said vehicle, a transversely extending shaft carried by the vehicle for rotation about its axis, two arms secured to the shaft and spaced lengthwise thereon, links connecting the arms to the rake head at a point above its pivotal connection with the pusher bars, and means for turning the shaft to effect a tilting of the rake head.

7. In a power operated sweep rake of the type operated by an automotive vehicle having a front wheel and rear wheels, the combination with said vehicle of two pusher bars pivotally connected at their rear ends therewith, a rake head pivoted to the front ends of the pusher bars, a transverse bar connected in horizontal position to said vehicle body above the center of the front wheel, vertical guide members carried by the transverse bar and extending downwardly adjacent the pusher bars, for limiting transverse movement of the pusher bars relative to said vehicle, supporting members for the pusher bars, adjustably secured to the guide members, for limiting the downward movement of the pusher bars whereby the angle that the rake teeth make with the ground can be changed without changing the ground pressure per unit of force exerted by the pusher bars, a transversely extending shaft carried by the vehicle for rotation about its axis, two arms secured to the shaft and spaced lengthwise thereon, links connecting the arms to the rake head at a point above its pivotal connection with the pusher bars, and means for turning the shaft to effect a tilting of the rake head.

8. In a power operated sweep rake of the class wherein the rake head is positioned in front of an automotive vehicle and suspended from pusher bars pivotally connected with the vehicle and projecting forwardly therefrom, the pivotal connection being positioned above the plane of the rake teeth, means for supporting the pusher bars from the vehicle at a point to the rear of the pivotal connection with the rake head, said means comprising vertical guide members positioned adjacent the pusher bars, means for changing the angle between the rake teeth and the ground while the pusher bars rest on their supports, and the tip of the rake teeth rest on the ground, and means for tilting the rake head about its pivotal connection.

JOSEPH H. COPE.